United States Patent [19]

Ahern et al.

[11] Patent Number: 4,759,636
[45] Date of Patent: Jul. 26, 1988

[54] METHOD AND SYSTEM FOR REAL-TIME PROCESSING OF SEISMIC DATA

[75] Inventors: Timothy K. Ahern; Edwin L. Tree, both of Tulsa, Okla.

[73] Assignee: Amoco Corporation, Chicago, Ill.

[21] Appl. No.: 809,618

[22] Filed: Dec. 16, 1985

[51] Int. Cl.[4] .............................................. G01V 1/24
[52] U.S. Cl. ...................................... 367/21; 367/52; 364/421
[58] Field of Search ........................ 367/21, 52, 38, 63; 364/421; 346/33 C

[56] References Cited

U.S. PATENT DOCUMENTS 2,998,592  8/1961  Wells ...................................... 367/52

OTHER PUBLICATIONS

Proseis 9600 Real Time on Board Seismic Processing System, 699.
Darby et al., "Computer Systems for Real-Time Marine Exploration", Geophysics, vol. 38, #2, pp. 301-308.

Primary Examiner—Thomas H. Tarcza
Assistant Examiner—Ian J. Lobo
Attorney, Agent, or Firm—Timothy D. Stanley

[57] ABSTRACT

The present invention relates generally to a method and system for the real-time processing of seismic signals collected with multichannel seismic systems and to a stand-alone system for verifying the quality of such seismic signals so as to quickly and accurately determine if the acquisition parameters established for the multi-channel seismic system are producing interpretable seismic data. More particularly, a method for obtaining surrogate seismic signals representative of a multichannel set of seismic signals acquired with a marine exploration system and a measure of their quality are provided.

14 Claims, 5 Drawing Sheets

MOVEOUT CORRECTION
LOOKUP TABLE

5C

5A

5B

METHOD AND SYSTEM FOR REAL-TIME PROCESSING OF SEISMIC DATA

BACKGROUND OF THE INVENTION

The present invention relates generally to a method and system for the real-time processing of seismic signals collected with multichannel seismic acquisition systems and to a stand-alone system for verifying the quality of such seismic signals so as to quickly and accurately determine if the acquisition parameters established for the multichannel seismic system are producing interpretable seismic data. More particularly, a method for obtaining surrogate seismic signals representative of a multichannel set of seismic signals acquired with a marine exploration system is provided.

Marine seismic exploration is a well-known method of geophysical investigation which is widely employed to locate undersea geological formations which may contain hydrocarbons. Marine seismic exploration is typically accomplished by towing a seismic source array, comprising one or more seismic wave generators such as air guns, and a sensor array having a multiplicity of hydrophones or other suitable transducers in a trailing sensor array over an area to be explored. As the seismic source array passes over the exploration area, it is periodically activated to produce seismic waves in the water which travel outward and downward through the sea floor and subterranean formations. Portions of the seismic wave energy are reflected back into the water by the sea floor and at each of the underlying subterranean formation interfaces. The returning reflected waves are detected by the hydrophones in the trailing sensor array which develop output signals from which the time of passage of the reflected wave can be determined. The propagation time of a seismic wave to and from a reflection point is directly related to the depth of that point. The sensor array can produce a plurality of such seismic signals which can be subsequently processed to generate topographical representations of the subterranean formations for analysis. The seismic source array and trailing sensor array are towed continually through the exploration area while gathering seismic data.

Marine seismic data is most typically gathered employing the common depth point technique. This is accomplished with the marine seismic exploration system previously described by periodically firing the seismic source array when it and a hydrophone of a trailing sensor array are approximately equidistant from an intermediate reflection point. Multichannel shot records of seismic signals are generated by the sensor array for each firing of the seismic source array. Each successive initiation of the seismic source array produces seismic waves which are reflected at an increasingly greater angle from the same reflection point. The multichannel shot records of seismic signals can be sorted for a particular reflection point by the common depth point technique and can be combined or stacked by subsequent data processing. A normal moveout correction function is applied to the gathered seismic signals to compensate for the slightly different path lengths of the incident reflected seismic waves producing each common depth point. Correction for normal moveout and stacking a series of seismic signals generated by the common depth point technique produces a composite seismic signal representing an ideal normal reflection of a seismic wave in which the ratios of the primary reflection return signal strength to noise and secondary return strength are improved.

Current marine seismic exploration techniques, as well as certain land seismic exploration techniques, involve the acquisition of multichannel seismic data; e.g., a shot record of 120 different seismic signals for each firing of the seismic source array. The acquisition of such multichannel seismic data is both an expensive and cumbersome process, which if done incorrectly, can be extremely costly to replicate at a later date. As such, the need has arisen to provide a real-time seismic processing system which can provide comprehensive seismic data quality control to insure that interpretable seismic signals have been acquired as well as to optimize certain of the acquistion parameters for the seismic source and seismic sensor arrays. Moreover, it would be advantageous to provide locally a preliminary interpretation of the seismic data acquired during the acquisition or to be able to economically transmit seismic data by way of satellite transmission to another locale for processing and interpretation.

In order to provide real-time processing of multichannel seismic data generally requires a computing system of considerable capacity. Moreover, satellite transmission of multichannel seismic data can be prohibitively expensive because of the vast amount of data included in multichannel seismic data. The present invention provides a solution to such obstacles by processing with a minicomputer only selected channels of the multichannel seismic data to produce surrogate seismic signals representative of the multichannel seismic signals. Since the surrogate seismic signals can represent a substantial reduction in the volume of the multichannel seismic data, satellite transmission of such surrogate seismic signals can now be done more economically.

SUMMARY OF THE INVENTION

The present invention is directed to a method of processing multichannel seismic data on a real-time basis whereby surrogate seismic signals are developed. The surrogate seismic signals can provide a comprehensive method of seismic data quality control and a method to evaluate and optimize acquisition parameters for collecting the seismic data with a multichannel acquisition system. Real-time seismic sections can be made from the surrogate signals to provide preliminary interpretations of the multichannel seismic data. Since the surrogate seismic signals represent a reduction in the quantity of seismic data in the multichannel seismic data, satellite transmission of the seismic data becomes more economically feasible.

The present invention is directed to a stand-alone system for real-time processing selected channels of seismic signals of a multichannel acquisition system. The system includes a seismic signal processor for amplifying and filtering selected analog seismic signals of the multichannel set of analog seismic signals and for forming a multiplexed seismic signal. The system also includes an analog-to-digital converter for sampling the multiplexed seismic signal at selected time intervals to form digitized seismic signals. Acquisition parameters of the multichannel acquisition system are keyed into the minicomputer which generates a normal moveout correction look-up table employing the keyed in acquisition parameters. The normal moveout correction look-up table resamples the selected digitized seismic signals to a lower sampling rate by relating predetermined actual two-way travel times of the selected digitized seismic signals to normal moveout corrected times in normal moveout corrected seismic signals. The normal moveout correction look-up table is calculated to a precision equal to the sample interval of the selected digitized seismic signal. The minicomputer moveout corrects and common depth point sorts and stacks the digitized seismic signals to form surrogate seismic signals. The system further includes a graphics display system for displaying the surrogate seismic signals as common depth point seismic sections in real-time.

The present invention also provides a method of real-time processing seismic data comprising the steps of selecting predetermined near offset channels of the multichannel acquisition system for real-time processing of the seismic signals developed by the selected near offset channels. A normal moveout correction look-up table is generated to correct for normal moveout in seismic signals developed by the selected near offset channels. The moveout correction look-up table is calculated for a first set of acquisition parameters of the multichannel acquisition system and for predetermined sample intervals between normal moveout correction times. During seismic data acquisition with the multichannel acquisition system, the seismic signals of each shot record developed by the selected near offset channels of the multichannel acquisition system are collected and sampled to form a digitized seismic signal. The normal moveout correction look-up table is calculated to a precision equal to the sample interval of the selected digitized seismic signal. The time intervals between samples of the digitized seismic signals are shorter than the time intervals between samples of the moveout corrected signal so as to effect a resampling of the selected digitized seismic signals. The moveout corrected seismic signals are common depth point sorted and stacked accordingly to form surrogate seismic signals in real-time from which real-time seismic sections can be produced to evaluate and optimize the first set of acquisition parameters for collecting seismic data with the multichannel acquisition system. The present invention also provides the method for obtaining estimates of the signal-to-noise ratio from the surrogate seismic signals in real time.

DESCRIPTION OF THE PREFERRED EMBODIMENT

The present invention relates to a method and system for processing sets of multichannel seismic data on a real-time basis.

Historically, marine seismic data have been collected with very few ways of determining the quality of the seismic data as it is acquired. A quality control specialist on board the acquisition boat normally can view camera records of individual shots or an electrostatic plotter display of a single hydrophone group in a sensor array. Certain aspects of the seismic data quality can be viewed using these aids; but both suffer from the limitations of having only unstacked seismic signals displayed. Until recently, it was not economical to install on board the boat a computer of sufficient power to perform real-time processing of multichannel seismic data. The present invention relates to a system and method for processing selected channels of marine seismic data and/or seismic data collected in any complex multichannel acquisition scheme whereby stacked seismic signals and seismic sections can be produced in real-time having comparable quality to conventionally processed seismic signals. Another important feature of the present system is the ability to estimate the signal-to-noise ratio of the seismic data in real-time.

Figure 1:
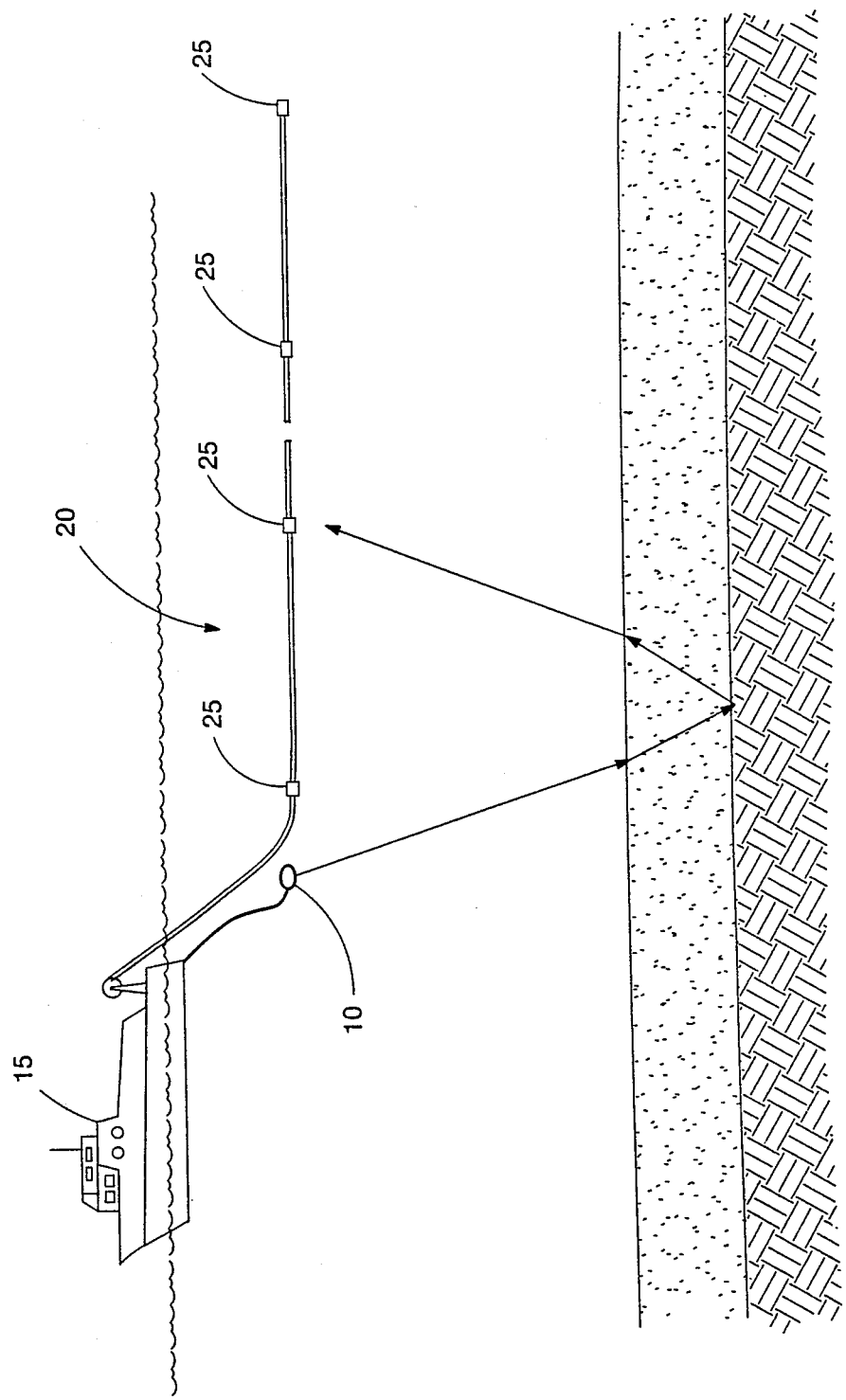
FIG. 1 is a schematic representation of the marine seismic exploration technique.

As seen first in FIG. 1, a schematic representation of a multichannel marine seismic acquisition system is shown. Typical of marine seismic exploration, a seismic source array 10 is towed behind a boat 15 and the seismic source array 10 is periodically activated to generate seismic waves which travel outward and downward to the ocean floor and thereafter propagate through the earth's subterranean formations. The seismic waves are refracted and reflected by the various subterranean formations and subsequently detected by a trailing seismic sensor array 20, also towed by the boat 15. The sensor array 20 includes a plurality of hydrophones 25. Prior to commencing the acquisition of seismic data, certain acquisition parameters are first established. Typically, the acquisition parameters include such things as acquisition array geometry, i.e., seismic source array to sensor array spacing or offset, location of seismic source relative to the boat, location of sensor array relative to the boat, relative location of hydrophones comprising sensor array and number of recording channels.

Figure 2:
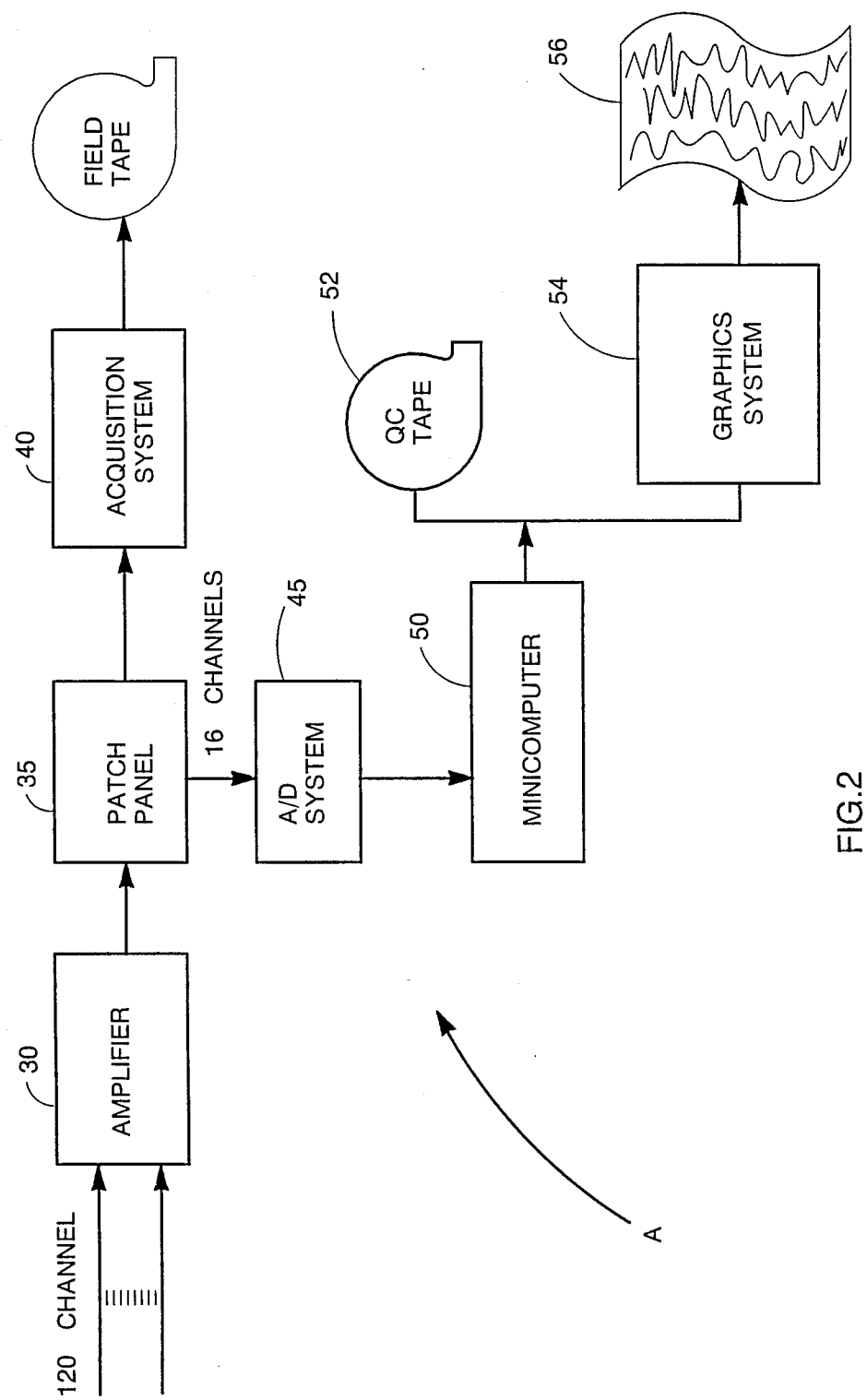
FIG. 2 is a schematic representation of the present invention as it interfaces with the conventional seismic acquisition system.

Looking now to FIG. 2, a block diagram is provided of the major components of a real-time processing system of the present invention, indicated by the letter A. For the purposes of example only, it is assumed that a multichannel marine acquisition system is utilized producing a shot record of 120 channels of seismic signals for each firing of the seismic source array. Conventionally, analog signals are produced by the hydrophones 25 of the seismic sensor array 20 and can be amplified at 30 and then passed through a patch panel 35 to a conventional seismic acquisition system 40. Conventional seismic acquisition systems 40 can include: Texas Instruments' DFS V or Sercel's SN-338. The output of such seismic acquisition 40 system is a field tape including all 120 channels of the seismic signals suitable for subsequent processing by a mainframe computer. The real-time processing system A is connected to the patch panel 35. The real-time processing system A includes an analog-to-digital processing system 45 which amplifies, filters, multiplexes and digitizes certain channels of the analog seismic signals selected from the complete set of multichannel analog seismic signals. Alternatively, the real-time processing system A can be adapted to receive previously amplified, filtered and digitized seismic data for selected channels of the multichannel seismic data recorded on tape. In the preferred embodiment, 32 channels of seismic signals are selected from the 120-channel input. However, as few as 8 channels of seismic signal can be selected from the 120-channel input and produce satisfactory results. The criteria for selecting which channels are to be processed will be discussed later.

It should be noted that the real-time processing system A has an input impedance considerably greater than the input impedance of the acquisition system 40, such that the presence of the real-time processing system A does not substantially affect the normal acquisition of seismic data with the acquisition system 40. The real-time processing system A further comprises a minicomputer 50, such as a Perkin-Elmer 3210 minicomputer, for correcting the selected seismic signals for normal moveout as well as common depth point sorting and stacking the normal moveout corrected seismic signals to form surrogate seismic signals. Both the processed seismic data, i.e., surrogate signals, and the unprocessed seismic data, i.e., the amplified, filtered and digitized selected seismic signals but not normal moveout corrected, sorted or stacked from the A/D processing system 45, can be sent to a tape 52 for further processing and/or to a graphics display system 54 including a plotter 56 whereby real-time seismic sections can be produced.

Figure 3:
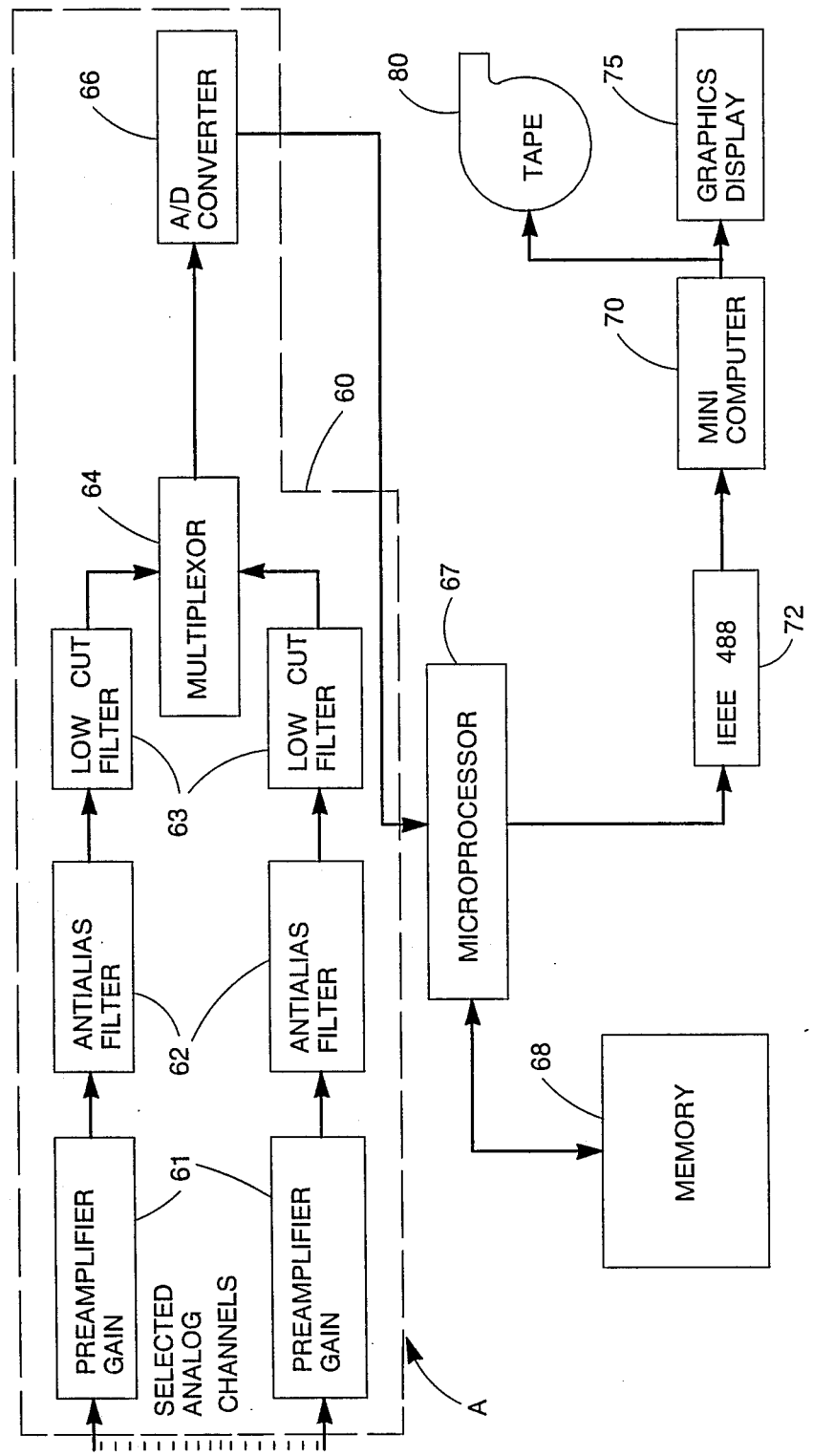
FIG. 3 is a block diagram of a processing system of the present invention.

FIG. 3 is a functional block diagram of the real-time processing system A of the present invention. Each of the selected channels of analog seismic signals are input to an analog processing system 60 which includes preamplifiers 61 and anti-alias filters 62 and low cut filters 63 for separately processing each of the selected channels. The preamplifiers 61 have programmable gains of 0 db to 60 db in 6 db steps. The anti-alias filters 62 are designed with a corner frequency of 100 Hz and a slope of 48 db per octave. The antialias filters 62 insure that any residual alias energy developed as a result of resampling the seismic data during a moveout correction process to be discussed below has an insignificant value. The low cut filters 63 are manually selectable from a 3 Hz, 6 db per octave to 8 Hz, 18 db per octave settings. The analog seismic signals can be sampled in 0.5 msec time intervals for up to eight channels or at sampling rates of 1, 2, or 4 msec time intervals for 16 channels by a 16-bit analog-to-digital converter 66 which provides a 96 db instantaneous dynamic range. Additional channels of selected seismic signals can be so digitized by providing additional parallel analog processing systems (not shown).

Prior to digitizing the seismic data, a multiplexor 64 is provided to multiplex the selected channels of seismic signals. The selected channels of seismic signals are thus digitized in a multiplexed format and are stored by a microprocessor 67, such as a Motorola 68000 microprocessor, in an internal memory 68 having 512 kbytes capacity. The microprocessor 67 transfers the seismic signals from internal memory 68 to minicomputer 70 in a trace sequential or demultiplexed format. The transfer of seismic data from the microprocessor 67 to the minicomputer 70 is over an IEEE 488 interface 72.

The minicomputer 70 is preferably a Perkin-Elmer 3210 minicomputer. The minicomputer 70 is configured with 4 Mbytes of memory, a 474 Mbyte Winchester disk and serial interfaces to terminals, a graphics display system 75 for plotting seismic sections, as well as recording tape 80 comprising two STC 2920 low-power tape drives capable of recording densities of either 1600 or 6250 bytes per inch. The operating tasks of the minicomputer 70 will be discussed later. Variable area seismic sections can be obtained in real-time by passing the surrogate seismic signals developed by the minicomputer 70 to the graphics display system 75 which includes a microcomputer, such as an APPLE MACINTOSH 512K. Rasterizing of the surrogate seismic signals from the minicomputer 70 is performed by the graphics display system 75 microcomputer, and plots can be developed by a dot matrix printer (not shown). Traces consisting of up to 8 sec of the seismic signals at a 4 msec sampling rate can be plotted in this manner. All of the system components can easily be packaged for rapid transportation and installation on marine seismic vessels.

Figure 4:
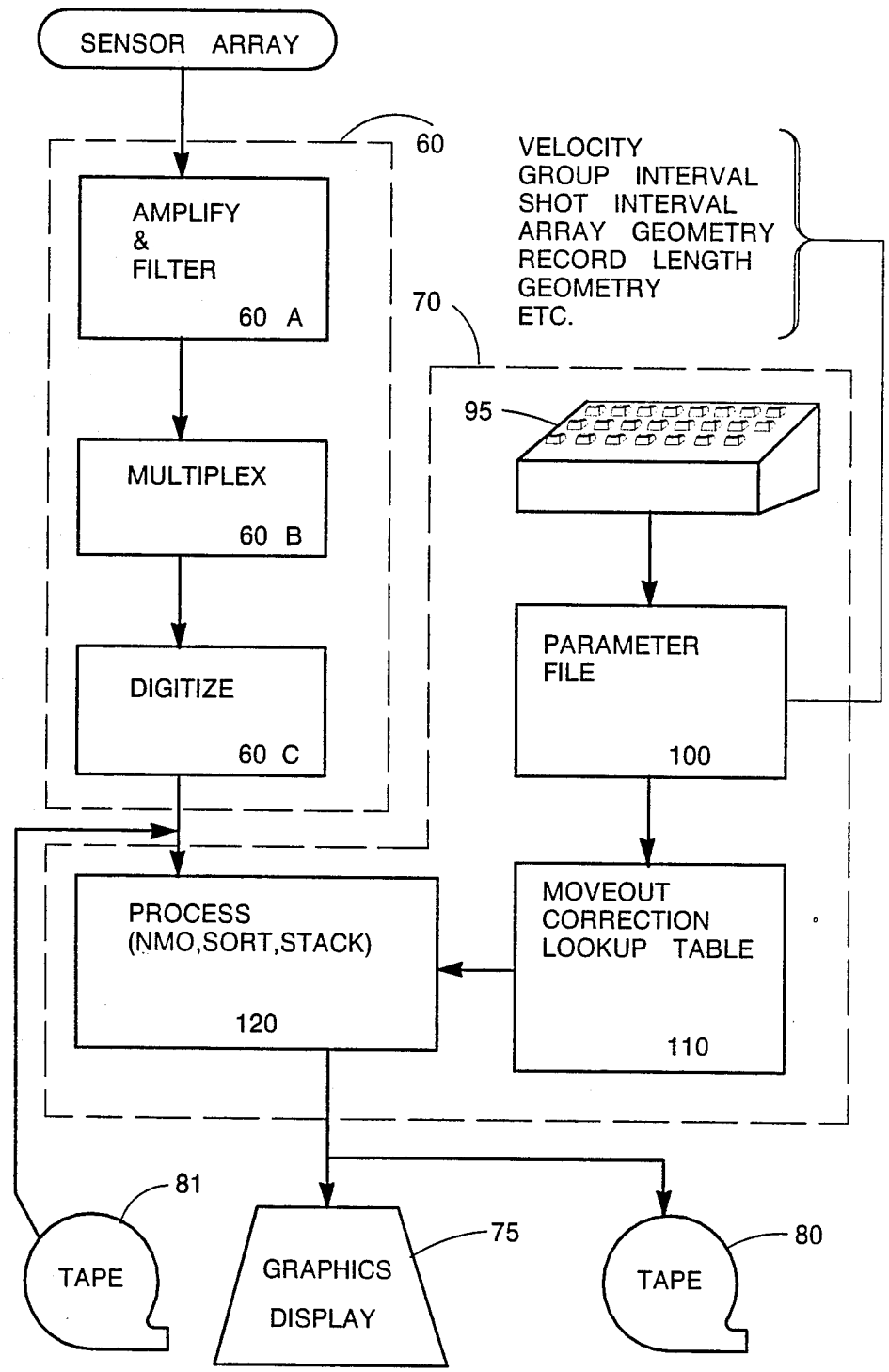
FIG. 4 provides a flow diagram of the processing of seismic data in accordance with the real-time processing technique of the present invention.

FIG. 4 is a block flow diagram of the real-time processing method of the present invention. An operator first inputs selected acquisition parameters into a parameter 100 file stored on the Winchester disk of the minicomputer 70. Typically, such parameters are keyed in by the operator using keyboard 95. This parameter file 100 is normally established at the beginning of a prospect area and does not need to be changed until either the acquisition parameters change or a new exploration area is entered. The operator enters the following parameters:

Digitization sampling rate
Normal moveout correction sampling rate
Record length
Record start time
Offset to first hydrophone group
Group interval spacing
Number of recording channels
Recording channels to be selected
Shooting geometry
Stretch mute percentage
Plotting parameters
Velocity functions
Preamplifier gain The processing steps incorporated within the real-time processing method include moveout correction with stretch muting, common depth point sorting and stacking of common depth point records, adjacent surrogate signal mixing (one surrogate seismic signal is plotted every initiation or shot of the seismic source array no matter what shooting geometry is selected), plotting of the surrogate seismic signals and recording of the unprocessed seismic data and/or the surrogate seismic signals in SEG-Y format at 6250 bytes per inch. In addition to the processing required to produce surrogate seismic signals in real-time, estimates of signal-to-noise ratio can also be obtained.

If the processing steps are to be performed in real-time, i.e. substantially performed within the time separating consecutive seismic source array initiations or shots (i.e., 7.5 to 11 seconds), the processing steps are crucial. Of these processing steps, normal moveout correction is a process in which most of the time-consuming calculations can be performed before the actual commencement of seismic data acquisition. Since the marine seismic acquisition system is substantially a fixed array geometry, i.e., the seismic source and sensor array relative locations remain substantially unchanged during acquisition, the moveout correction calculations can be greatly simplified. Consequently, a normal moveout correction look-up table 110 can be developed ahead of time from the parameter file 100 that relates which time sample of the digitized seismic signal of a shot record corresponds to a moveout corrected time as will be described below.

Figure 5:
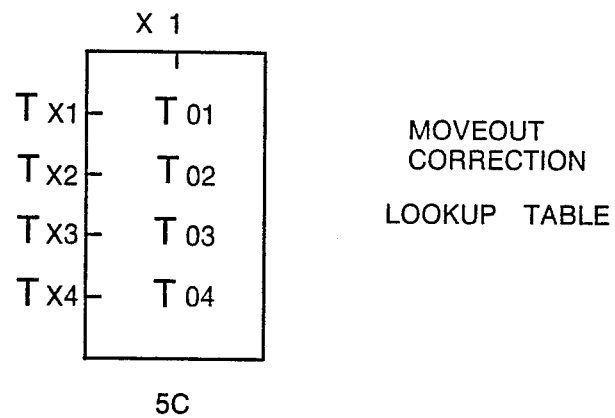
FIGS. 5a and 5b provide schematic representations of the need for moveout correction on a real-time basis as practiced in the present invention.
FIG. 5c depicts a simplified moveout correction look-up table to correct for normal moveout shown in FIGS. 5a and 5b.
Figure 5:
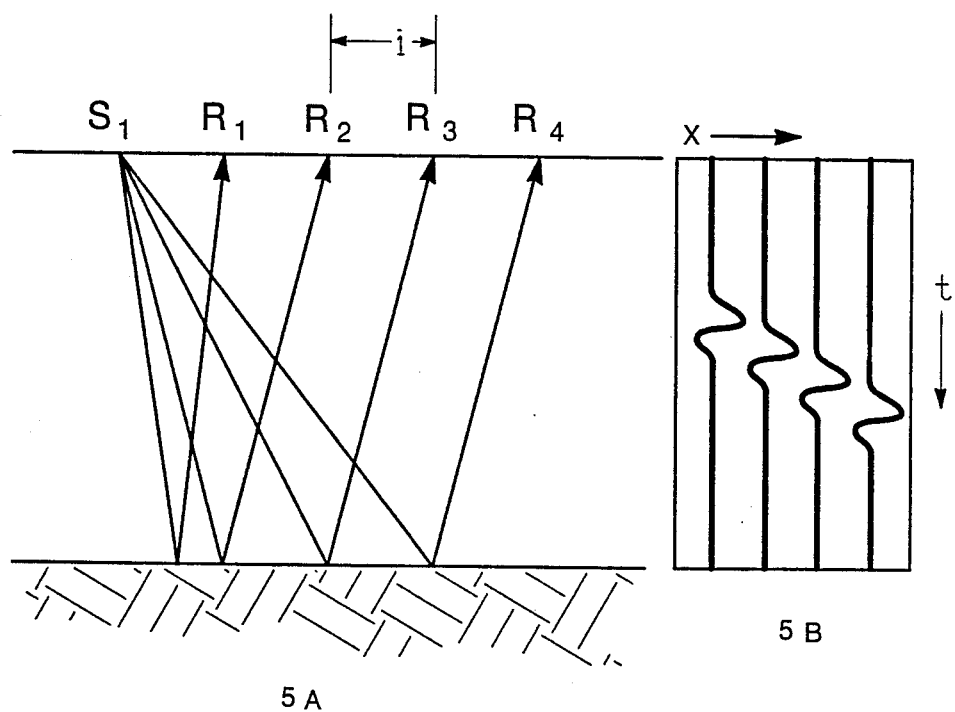

FIGS. 5A and B are demonstrative of the need to perform normal moveout correction because of the differences in travel paths of the seismic wave energy. In particular, FIG. 5A is exemplary of the differences in travel paths for seismic wave energy transmitted by a seismic source $S_1$ and detected by seismic sensors $R_1$, $R_2$, $R_3$ and $R_4$. Here each sensor array is spaced a group interval distance i apart and source/sensor offset x increases to the right. These different travel paths result in different arrival times of the seismic wave energy, as indicated by the time pulse events, in the shot record of FIG. 5B. The normal moveout correction look-up table 110 can be developed by assuming a velocity of propagation of the seismic wave energy, i.e., stacking velocity and given certain array geometry parameters such as group interval, seismic source array to seismic sensor array offset according to:

$$T_x = \frac{x^2}{V^2(T_o)} + T_o^2 \text{ }^{\frac{1}{2}} \quad (1)$$

where:
x=source/sensor offset;
$V(T_o)$=assumed stacking velocity at time $T_o$;
$T_o$=two-way normal traveltime to a selected point; and
$T_x$=actual two-way traveltime to the selected point for the selected offset x.

Thus, the time pulse events shown in FIG. 5B can be normal moveout corrected such that the time pulse events appear to occur at a time coinciding with the normal two-way travel distance according to Equation 1. A normal moveout correction look-up table such as shown in FIG. 5C can be developed knowing certain acquisition parameters regarding array geometry, seismic wave velocities, shooting interval, etc., such that normal moveout correction times $T_o$ can be related to actual two-way traveltimes $T_x$ for a selected offset distance x.

Knowing certain of the array geometry parameters ahead of time, such as the offset to the nearest hydrophone group and the distance between hydrophone groups; the digitization and moveout correction sample intervals or rates; and stacking velocities from the parameter file 100, the normal moveout correction look-up table 110 can be calculated that relates which digitized time sample of a selected seismic signal in a shot record corresponds to a given time sample location in the moveout corrected seismic signal. Calculation of the moveout correction look-up table 110 requires about 6 seconds by the minicomputer 70 but need only be done once before the seismic acquisition begins. If this precalculation was not performed, it would take 6 seconds per shot record to perform movement correction on the selected seismic signals. By the use of the precalculated normal moveout correction look-up table 110, the selected seismic signals, each having about 6 seconds of data, can be moveout corrected in about 300 msec. This time is totally consistent with real-time processing requirements.

Quite simply, the normal moveout correction look-up table 110 provides precalculated two-way normal traveltimes $T_o$ for selected offsets x, selected stacking velocity $V(T_o)$, and actual two-way traveltimes $T_x$. Actual two-way traveltimes $T_x$ are calculated to a precision equal to the time interval between samples at which the selected seismic signals are to be digitized using equation (1). Additionally, the selected digitized seismic signals are effectively resampled by the normal moveout correction look-up table since the time intervals between samples of the digitized seismic signals are shorter than the time intervals between normal moveout correction times, i.e., the digitization sampling rate is greater than the normal moveout correction sampling rate. In the preferred embodiment, actual two-way traveltimes $T_x$ are calculated to the nearest whole 1 msec in 4 msec increments of the normal two-way travel times $T_o$. Consequently, during real-time processing, the normal moveout correction look-up table 110 is used to map or relate sample values of the digitized seismic signals occurring at time $T_x$ to moveout corrected sample values of the digitized seismic signal occurring at time $T_o$. Since the actual two-way traveltimes $T_x$ are calculated in 4 msec increments of the normal two-way traveltime $T_o$, the selected digitized seismic signals are effectively resampled and compacted.

The moveout correction look-up table 110 is controlled by the parameter file 100. The unprocessed seismic signals from the analog processing system 60 (where the seismic signals are amplified and filtered at 60A; multiplexed at 60B; and digitized at 60C and generally contain seismic data sampled in 1 msec intervals) are corrected for normal moveout at 120 employing the previously generated normal moveout correction look-up table 110. Strictly speaking, a digital antialias filter should be applied to the seismic data before resampling from 1 msec to 4 msec. However, this is not needed because of the anti-alias filtering of the input analog signals was specifically designed to minimize the value of alias energy developed as the result of such resampling. In fact, the initial digitization of the seismic signals at the 1 msec sampling rate greatly simplifies the moveout correction process. By oversampling the selected seismic signals initially, samples values of the selected seismic signals for moveout corrected times intermediate to two samples times need not be calculated as is conventionally done. Quite simply, digitizing is less time consuming and computationally cumbersome than calculating interpolated sample values of seismic signals for moveout correction. By way of example, if the selected seismic signals are sampled once every 4 msec and the needed moveout corrected signal required a value of the selected seismic signal between such times, it would then have to be calculated. However, by oversampling at the 1 msec sampling rate and calculating actual two-way travel times only to the nearest 1 msec, such further calculations can be avoided since sample values of the selected seismic signals exist for each millisecond of data.

The moveout correction has no limitations as to group offsets. If the closest near offset (i.e., those with smallest source/receiver separation) channels of seismic signals are selected as the analog input to the real-time processing system A, preferably at least 8 channels, then the stacking velocities employed for moveout correction can be crude approximations. Using longer offset channels of seismic signals requires more accurate stacking velocities if one desires to avoid amplitude attenuation due to misalignment in the stack. The choice of stacking velocities and group offset is predetermined by the operator in developing the parameter file 100. The criteria for selecting which channels of the multichannel shot record of seismic signals are to be selected comprises:

(1) selecting near offset channels of a multichannel shot record which produce interpretable seismic data, wherein the near offset channels are those which have the shortest offset and for which crude approximations of the stacking velocity do not substantially affect the interpretability of common depth point sorted and stacked seismic signals;

(2) selecting at least 8 near offset channels of the multichannel shot record; and (3) selecting near offset channels of the multichannel shot record which are the least sensitive to crude stacking velocity approximations in Equation 1, where $T_o >> x/V(T_o)$.

Due to the substantially fixed geometries of the marine seismic acquisition system, common depth point sorting and stacking of moveout corrected seismic signals at 120 can be timely handled by the real-time processing system A. The real-time processing system A can handle any of three different seismic data acquisition geometries: (1) where the shooting interval (i.e., distance between initiations of the seismic source) is equal to one-half of the group interval (i.e., the spacing between adjacent seismic sensor array elements), (2) where the shooting interval is equal to the group interval, and (3) where the shooting interval is equal to multiples of the group interval. The particular type of acquisition geometry is determined by entry into the parameter file. The fold, i.e., common depth point multiplicity of the surrogate seismic signals is dependent upon the acquisition geometry. If N represents the number of selected channels of a multichannel shot record of seismic signals being processed, preferably at least 8 channels, the real-time processing system A produces one surrogate seismic signal of fold N for a shooting geometry where the shooting interval is equal to ½ the group interval. It will produce two surrogate seismic signals of fold N/2 where the shooting interval is equal to the group interval, and it will produce four surrogate seismic signals of fold N/4 where the shooting interval is equal to twice the group interval.

Estimates of signal-to-noise ratio can also be obtained at 120. The common depth point sorted seismic signals will pass the moveout correction analysis windows to an area of the minicomputer's memory that can be accessed by the signal-to-noise ratio calculation. The method for determining signal-to-noise ratios is obtained by analyzing the RMS (root mean square) amplitude increases as the moveout corrected seismic signals are stacked together. The signal-to-noise analyses are performed in real-time by coupling the minicomputer task performing signal-to-noise estimation to the task performing the depth point sorting. The signal-to-noise ratio can be estimated within up to five analysis windows every time a new shot record is recorded if desired. Positions of the analysis windows can be changed interactively by the operator without interrupting the real-time processing flow.

Stacking of the common depth point gathers of moveout corrected seismic signals at 120 to form surrogate seismic signals is done using a running summation technique. This approach reduces the amount of computer memory required by a factor approximately N, the number of selected channels of seismic signals being processed, as to memory that would be required if the separate seismic signals of the common depth gather were stored before stacking. This can reduce the required memory capacity from approximately 3 Mbytes to 200 Kbytes, for example, where N is 16.

The most time consuming process of the present real-time processing is that of plotting the surrogate seismic signals as traces or seismic sections by graphics display system 75. A 6 second seismic signal sampled at a 4 msec sampling rate, requires slightly more than 3.5 seconds to plot. For shooting geometries where more than a single surrogate seismic signal is produced per shot record, the plotting time for multiple traces could exceed the time between consecutive shots. For this reason, adjacent surrogate seismic signal mixing is performed in real-time before the surrogate seismic signals are plotted by the graphics display system 75. No matter which shooting geometry is used, all surrogate seismic signals that reach maximum fold, after a current shot record of the selected seismic signals is processed, are mixed (summed) together before plotting. This means that either 1, 2, or 4 surrogate seismic signals are mixed before real-time plotting for the following respective shooting intervals: once every half group interval; once every group interval; and once every two group intervals. It is important to note that when surrogate seismic signals are being recorded on magnetic tape 80, it is the unmixed surrogate seismic signals that are written to tape 80. The tape 80 can be processed at a later time, either on the boat or in a remote office, if the geophysicist wishes to review an unmixed display.

During the acquisition of seismic data, a variable area seismic section plot can be produced on the graphics display system 75. The seismic sections produced are of acceptable quality and can actually be used as a rough interpretation of the geological structure. An improved seismic section can be acquired by replotting the tapes when at a central processing center.

Because the real-time processing system A records both the unprocessed seismic signals and the unmixed processed seismic signals on magnetic tape 80 shown in FIG. 4, any seismic line of data can later be reprocessed for any reason the operator desires. Whenever the real-time processing system A is first started, the operator indicates whether he wants the input seismic data to come from the seismic sensor array, through the real-time processing system A, or from a previously recorded tape such as 81.

It is noted at this juncture that tapes 80 and 81 can be sequentially employed to record seismic data during the seismic data acquisition phase; however, when previously obtained seismic data is to be reprocessed during "offline" periods, a previously recorded tape 81 is employed to input the seismic data to minicomputer 70 and the tape 80 is employed to record the output processed seismic data from minicomputer 70. To economize time during the acquisition phase, both processed and unprocessed seismic data are recorded on a first tape, for example 80, until it reaches its capacity limits and then recording both the processed and unprocessed seismic data on a next tape, for example 81.

If the operator indicates seismic data are to be input from the previously recorded tape 81, the real-time processing system A will read the tape 81 and process it as if the seismic data had come from the seismic sensor array. Any of the processing parameters in parameter file 100 could first have been changed, such as the stacking velocity function, whereby the seismic section produced would change accordingly. If the input is from a previously recorded tape 81, the output tape 80 will contain the surrogate seismic signals. The graphics display system 75 can also plot the surrogate seismic signals or if the operator desires to speed up the reprocessing, he can indicate that no plot is required.

The real-time processing system A requires about 3½ seconds to reprocess a 16-channel shot record of selected seismic signals for the usual recording parameters. Thus, reprocessing without plotting can normally take place during line changes. An SEG-Y formatted tape containing surrogate seismic signals is obtained through this reprocessing method. The variable area plots produced by the real-time processing system A display surrogate seismic signals.

A method of estimating signal-to-noise ratios by measuring how amplitudes of surrogate seismic signals of increasing fold increase in magnitude in real-time is also provided at 120. In seismic signals, generally the signal component increases in proportion to the fold of the stack and the noise component thereof only increases as the square root of the fold. By measuring the RMS amplitudes of surrogate seismic signals of varying folds and fitting the best least squares line to the data, the signal-to-noise ratio can be estimated. This method was selected because it is computationally fast. By closely coupling the task of common depth point sorting with a task performing the signal-to-noise ratio estimate, the minicomputer 70 is capable of estimating signal-to-noise ratios for up to five selected analysis windows in real-time.

The analysis windows can contain up to 100 samples in size and can be changed interactively by the operator without affecting the real-time processing function. Normally, the variable area plot is consulted to determine the time limits of one to five analysis windows, the signal-to-noise task is started with these windows and estimates of the signal-to-noise ratios are printed on a printer after analysis windows reach full fold. This technique can be a very important aid in judging marine seismic data quality and can thus greatly reduce acquisition costs. Decisions as to when to stop acquiring data will be able to be made for geophysical reasons rather than simply on sea-state or cable noise.

To aid in viewing of previously recorded tapes 81 during line changes or at other times when the real-time processing system A is not occupied in processing data in real-time, three other processing tasks have been developed for the minicomputer 70. The first processing task labeled "PREP" reduces the amount of seismic data contained on the previously recorded tape 81 for either plotting or for transmission over a satellite link, where the volume of seismic data is a very important economic consideration. The previously recorded tapes 81 produced by the real-time processing system A either contain unprocessed seismic signals and/or unmixed surrogate seismic signals. If the operator desires to process the unprocessed seismic signals, PREP will prompt the operator for a surrogate seismic signal starting and ending time, windowing data from the starting time to the ending time; a starting record number and ending record number, effectively performing a record edit of the data; and a starting and ending surrogate seismic signal number, effectively performing seismic signal time editing. The volume of seismic data can be greatly decreased using this technique because of mixing the surrogate seismic signals and time windowing the mixed surrogate seismic signals to a time window of interest.

It is noted that PREP is capable of extracting a single seismic trace off a tape containing multiple shot records. In this manner, a previously recorded tape 81 containing data from a single hydrophone can be obtained. Plotting such a tape yields a plot similar to that obtained on the electrostatic plotters found on most seismic vessels. The variable area plot obtained in this manner is, however, superior in quality.

If the operator desires to reprocess the unmixed surrogate seismic signals from the previously recorded tape 81, PREP again prompts the operator to enter a surrogate seismic signal starting and ending time for windowing. It also requires entry of the starting and ending common depth point record numbers for record editing and asks for the number of adjacent traces it should mix together on the output tape. This trace mixing capability can greatly further reduce the volume of seismic data which aids in reducing both satellite transmission time and onboard plotting time. Data are converted from 32-bit floating point numbers to 16-bit integer numbers on the output tape 80.

A second processing task labeled "PLOT" allows offline plotting of any SEG-Y formatted tape produced by the real-time processing system. PLOT prompts the user for starting and ending times of the plot window, plotting scale in samples/inch, a time varying scaling factor of the form time raised to a power. PLOT can be used to plot tapes generated by the real-time processing system A or generated by PREP. This provides an extremely flexible post-plotting system built around the MACINTOSH variable area plotter of the graphics display system 75.

A third processing task labeled "PARAM" serves as the interface between the person using the real-time processing system A and the parameter file 100 that controls the processing functions. Parameters that may be changed using PARAM fall into the three categories: processing parameters, plotting parameters, and stacking velocity functions.

The processing parameters that may be altered include the input sampling rate at which the A to D conversion takes place, the output sampling rate to which the normal moveout correction algorithm will resample the data; the record lengths, the starting of the record, number of channels being recorded, the channels to be selected, the offset distance to the first hydrophone group, the group interval, the shooting geometry that relates the group interval to the shot interval, and the stretch mute percentage desired.

Plotting parameters give control over such parameters as the starting and ending times of the plot window, the trace scale in samples/inch, the interval between trace labels and timing line spacing. Extensive error checking is performed to insure that the requested plotting parameters are within the capabilities of the plotting system.

The stacking velocity can easily be entered using PARAM. The user is prompted to enter the stacking velocity at time zero and reminds him that this is normally the water velocity. The remaining time-velocity pairs are entered with PARAM insuring that the velocities are input in increasing time order. This process continues until a time greater than or equal to the record length is entered.

The results of running PARAM are stored in the parameter file 100 that the real-time processing system A will access the next time it is run. PARAM also saves the parameter file that existed before it was run. If errors are made in the parameter entry and the user wishes to restore the previous parameter file, he may do this by simply typing PARAM OLD. The old parameter file will be input, can be modified by entering new parameters or may simply be restored to disk.

The invention having been described in detail, various other changes and modifications thereto will suggest themselves to those skilled in the art, which changes and modifications are intended to fall within the scope of the invention.

What is claimed is:

1. A method of real-time processing of seismic data collected with a multichannel seismic acquisition system of N channels comprising the steps of:
   (a) selecting a plurality of near offset channels of a multichannel acquisition system for real-time processing of the seismic signals developed by the selected near offset channels, wherein the selected near offset channels of seismic signals of the multichannel acquisition system are the least sensitive to stacking velocity approximations and are less than N;
   (b) generating a normal movemout correction look-up table to correct for normal moveout in the seismic signals developed by the selected near offset channels, wherein the normal moveout correction look-up table is calculated for a first set of acquisition parameters of the multichannel acquisition system and for predetermined time increments of normal moveout correction times $T_o$;
   (c) collecting and sampling seismic signals of each shot record developed by the selected near offset channels to form digitized seismic signals, wherein the time increments between samples of the digitized seismic signal are shorter than the time increments of the normal moveout correction times $T_o$;
   (d) moveout correcting the digitized seismic signals of the selected near offset channel in accordance with the normal moveout correction look-up table to form moveout corrected seismic signal; and
   (e) common depth point sorting and stacking the moveout corrected signals to form surrogate seismic signals in real-time to evaluate and optimize the first set of acquisition parameters for collecting seismic data with the multichannel acquisition system, wherein the surrogate seismic signal is representative of the seismic data developed by all channels of the multichannel acquisition system.

2. The method of claim 1 further including the step of real-time plotting of surrogate seismic signals as seismic sections.

3. The method of claim 1 further including the step of forming a plurality of surrogate seismic signals for adjacent common depth points from each shot record of seismic signals from the selected near offset channels.

4. The method of claim 3 further including the step of mixing surrogate seismic signals from adjacent common depth points.

5. The method of claim 4 further including real-time plotting of the mixed surrogate seismic signals as seismic sections.

6. The method of claim 1 further including the step of obtaining real-time signal-to-noise estimates from the surrogate seismic signals.

7. The method of claim 1 wherein (a) comprises selecting at least eight near offset channels.

8. The method of claim 7 wherein (a) comprises selecting near offset channel having the shortest offsets.

9. The method of claim 1 further including the steps of:
   (a) generating a revised normal moveout correction look-up table to correct for normal moveout seismic signals developed by the selected near offset channels, wherein the revised normal moveout correction look-up table is calculated for a second set of acquisition parameters of the multichannel acquisition system and for predetermined sample intervals of normal moveout correction times $T_o$;
   (b) collecting and sampling seismic signals of each shot record developed by the selected near offset channels to form digitized seismic signals, wherein the sample intervals of the digitized seismic signal are less than the sample intervals of the moveout correction times $T_o$;
   (c) moveout correcting the digitized seismic signal of the selected near offset channel in accordance with the normal moveout correction look-up table to form moveout corrected seismic signal; and
   (d) common depth point sorting and stacking the moveout corrected signals to form surrogate seismic signals in real-time to evaluate and optimize the first set of acquisition parameters for collecting seismic data with the multichannel acquisition system.

10. The method of claim 1 wherein one surrogate seismic signal of fold N is generated for each shot record when the multichannel acquisition system shooting interval is equal to ½ group interval, where N represents the number of channels selected for real-time processing.

11. The method of claim 1 wherein two surrogate seismic signals of fold N/2 are generated for every shot record when the multichannel acquisition system shooting interval is equal to group interval where N represents the number of channels selected for real-time processing.

12. The method of claim 1 wherein four surrogate seismic signals are generated for each shot record when the multichannel acquisition system shooting interval is equal to twice group interval where N represents the number of channels selected for real-time processing.

13. The method of claim 12 further including the step of:
   (a) mixing adjacent surrogate seismic signal; and
   (b) plotting the mixed the adjacent surrogate seismic signals as a seismic section.

14. An apparatus for real-time processing of seismic data obtained with a multichannel acquisition system of N channels comprising:
   (a) processing means for amplifying, filtering and multiplexing selected near offset channels of seismic signals of a multichannel acquisition system, wherein the selected near offset channels of seismic signals are the least sensitive to stacking velocity approximations and are less than N;
   (b) means for sampling the amplified, filtered and multiplexed seismic signals at selected time intervals to form digitized seismic signals;
   (c) means for inputting selected acquisition parameters of the multichannel acquisition system;
   (d) means for generating a moveout correction look-up table employing the selected acquisition parameters, wherein actual two-way travel times are related to moveout corrected times including means for resampling the digitized seismic signals;

(e) means for moveout correcting, common depth point sorting and stacking, in real time, seismic signals to form surrogate seismic signals wherein the surrogate seismic signals are representative of the seismic data developed by all channels of the multichannel acquisition system; and (f) means for plotting the surrogate seismic signals as seismic sections in real-time.

* * * * *

UNITED STATES PATENT OFFICE
CERTIFICATE OF CORRECTION

PATENT NO. : 4,759,636

DATED : July 26, 1988

INVENTOR(S) : Timothy K. Ahern and Edwin L. Tree

It is certified that error appears in the above-identified patent and that said Letters Patent are hereby corrected as shown below:

Column 1, line 64, "Correction" should read --Correcting--.

Column 14, Claim 13, line 47, " claim 12" should read --claim 11 or 12--.

Signed and Sealed this

Twenty-eighth Day of February, 1989

Attest:

DONALD J. QUIGG

Attesting Officer

Commissioner of Patents and Trademarks